United States Patent
Yamada et al.

(10) Patent No.: US 9,935,303 B2
(45) Date of Patent: Apr. 3, 2018

(54) ALUMINA SLURRY (71) Applicant: MITSUBISHI PLASTICS, INC., Chiyoda-ku (JP)

(72) Inventors: Hiroto Yamada, Ogaki (JP); Tomoyuki Nemoto, Nagahama (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/034,089

(22) PCT Filed: Dec. 8, 2015

(86) PCT No.: PCT/JP2015/084426
§ 371 (c)(1),
(2) Date: May 3, 2016

(87) PCT Pub. No.: WO2016/093242
PCT Pub. Date: Jun. 16, 2016

(65) Prior Publication Data
US 2016/0351880 A1 Dec. 1, 2016

(30) Foreign Application Priority Data

Dec. 10, 2014 (JP) .................................. 2014-250244

(51) Int. Cl.
*H01M 2/16* (2006.01)
*H01M 10/052* (2010.01)
(Continued)

(52) U.S. Cl.
CPC ............. *H01M 2/1686* (2013.01); *B32B 5/32* (2013.01); *B32B 27/32* (2013.01); *C01F 7/02* (2013.01);
(Continued)

(58) Field of Classification Search
None
See application file for complete search history.

(56) References Cited

U.S. PATENT DOCUMENTS

2014/0193692 A1* 7/2014 Yamada .................. B32B 27/32
429/144

FOREIGN PATENT DOCUMENTS

JP 2002-200432 A 7/2002
JP 2004-227972 A 8/2004
(Continued)

OTHER PUBLICATIONS

International Search Report dated Jan. 19, 2016 in PCT/JP2015/084426 Filed Dec. 8, 2015.

*Primary Examiner* — Daniel Gatewood
(74) *Attorney, Agent, or Firm* — Oblon, McClelland, Maier & Neustadt, L.L.P.

(57) ABSTRACT

An alumina slurry containing alumina dispersed in a dispersion medium, the alumina having an average primary particle diameter of 0.1 μm or more and 1.0 μm or less, the alumina satisfying the following condition (1), and the slurry having a content of the alumina of 30% by mass or more and 70% by mass or less and a content of water in the dispersion medium of 50% by mass or more:
condition (1): in relationship of a pore diameter r1 (Å) and a pore volume Dv1 (mL/g) of the alumina measured by a nitrogen desorption method based on JIS Z8831-2 (2010), the pore volume Dv1(80) at r1=80 and the maximum value Dv1(M) of Dv1 in a range 20≤r1≤80 satisfy Dv1(M)>Dv1(80).

15 Claims, 1 Drawing Sheet (51) Int. Cl.
*H01M 10/0525* (2010.01)
*C01F 7/02* (2006.01)
*C08K 7/24* (2006.01)
*B32B 5/32* (2006.01)
*B32B 27/32* (2006.01)
*C08J 9/42* (2006.01)
*H01M 10/0566* (2010.01)
*C09D 1/00* (2006.01)
*C09D 129/04* (2006.01)
*C09D 5/00* (2006.01)
*C09D 7/12* (2006.01)
*C09D 127/16* (2006.01)
*C08J 5/18* (2006.01)
*C08K 3/22* (2006.01)

(52) U.S. Cl.
CPC ............... *C01F 7/026* (2013.01); *C08J 5/18* (2013.01); *C08J 9/42* (2013.01); *C09D 1/00* (2013.01); *C09D 5/00* (2013.01); *C09D 7/1275* (2013.01); *C09D 7/1291* (2013.01); *C09D 127/16* (2013.01); *C09D 129/04* (2013.01); *H01M 2/16* (2013.01); *H01M 2/1646* (2013.01); *H01M 2/1653* (2013.01); *H01M 10/052* (2013.01); *H01M 10/0525* (2013.01); *H01M 10/0566* (2013.01); *C01P 2004/62* (2013.01); *C01P 2006/12* (2013.01); *C01P 2006/14* (2013.01); *C01P 2006/16* (2013.01); *C01P 2006/22* (2013.01); *C08J 2323/02* (2013.01); *C08J 2429/04* (2013.01); *C08K 7/24* (2013.01); *C08K 2003/2227* (2013.01)

(56) References Cited

FOREIGN PATENT DOCUMENTS

| | | | |
|---|---|---|---|
| JP | 2008/31010 | A | 2/2008 |
| JP | 2008-186721 | A | 8/2008 |
| JP | 2008-305783 | A | 12/2008 |
| JP | 2010-257689 | A | 11/2010 |
| JP | 2010257689 | A * | 11/2010 |
| JP | 2013-129574 | A | 7/2013 |
| JP | 2013-168361 | A | 8/2013 |
| JP | 2014-192143 | A | 10/2014 |
| JP | 2014-208780 | A | 11/2014 |
| JP | 2014208780 | A * | 11/2014 |
| WO | 2005/092794 | A1 | 10/2005 |
| WO | 2008/149986 | A1 | 12/2008 |
| WO | 2012/023199 | A1 | 2/2012 |

* cited by examiner

ALUMINA SLURRY

TECHNICAL FIELD

The present invention relates to an alumina slurry. More specifically, the present invention relates to an alumina slurry that is suitable for forming a coated layer which is excellent in air permeation property, heat resistance and the like and which constitutes a multilayer porous film capable of being used as a battery separator and the like, a multilayer porous film obtained by using the same, and a separator for a nonaqueous electrolytic solution secondary battery and a nonaqueous electrolytic solution secondary battery using the multilayer porous film.

BACKGROUND ART

A polymer porous material having numerous fine continuous pores is utilized in various fields including a separation membrane used for production of ultrapure water, purification of a drug solution, water processing and the like, a moisture permeable waterproof film used for clothing, a sanitary material and the like, and a battery separator used in a secondary battery and the like.

A secondary battery has been widely used as a power source for an office automation equipment, a factory automation equipment, a home electronic equipment, and a portable equipment, such as a communication equipment. In particular, there has been increasing use of a portable equipment using a lithium ion secondary battery, which leads to reduction in size and weight of the equipment due to the good volume efficiency thereof on installing in the equipment. A large-scale secondary battery has been studied and developed in many fields relating to energy and environmental issues, such as a load bearing equipment, an uninterruptible power supply system (UPS), and an electric automobile, and there have been spreading applications of a lithium ion secondary battery, which is a kind of a nonaqueous electrolytic solution secondary battery, due to the large capacity, the high output power, the high voltage, and the excellent long-term storage stability thereof.

A lithium ion secondary battery is generally designed to have an upper limit of the working voltage of from 4.1 to 4.2 V. An aqueous solution cannot be used as an electrolytic solution therefor since an aqueous solution undergoes electrolysis at such a high voltage. Accordingly, a so-called nonaqueous electrolytic solution using an organic solvent is used as an electrolytic solution that is capable of withstanding the high voltage. As a solvent for the nonaqueous electrolytic solution, an organic solvent having a high dielectric constant capable of retaining a larger amount of lithium ion therein is used, and as the organic solvent having a high dielectric constant, an organic carbonate ester compound, such as propylene carbonate and ethylene carbonate, is mainly used. The solvent is used such that a highly reactive electrolyte, such as lithium hexafluorophosphate, as a supporting electrolyte functioning as a lithium ion source, is dissolved in the solvent.

A lithium ion secondary battery has a separator intervening between the positive electrode and the negative electrode for preventing internal short circuit from occurring. The separator is naturally demanded to have insulating property due to the function thereof. The separator is also demanded to have permeability as a path for lithium ion and a fine porous structure for performing diffusion and retention of an electrolytic solution. A porous film is used as the separator for satisfying these demands.

The importance of safety of a battery is being increased associated with the increase of the capacity of the battery in recent years. The characteristics contributing to the safety of the battery separator include shutdown characteristics (which are hereinafter referred to as SD characteristics). The SD characteristics relate to such a function that the fine pores of the porous film are closed in a high temperature state of approximately from 100 to 150° C., and as a result, the ionic conduction of the inside of the battery is interrupted, thereby preventing the temperature of the inside of the battery from being increased after that. In this case, the lowest temperature among the temperatures, at which the fine pores of the porous film are closed, is designated as the shutdown temperature (which is hereinafter referred to as a SD temperature). In the case where the porous film is used as a battery separator, the film necessarily has the SD characteristics.

However, associated with the increase of the energy density and the capacity of the lithium ion secondary battery in recent years, there is a possibility of an accident that the normal SD characteristics is not sufficiently exhibited, and the temperature of the inside of the battery is increased beyond approximately 130° C., which is the melting point of polyethylene used as the material of the battery separator, thereby causing the breakage of the separator through heat shrinkage thereof to cause a short-circuit between the electrodes and lead to ignition. Under the circumstances, the separator is demanded to have higher heat resistance than the current SD characteristics for ensuring the safety.

As a porous film used as the separator, for example, there is a proposal of a multilayer porous film containing a polyolefin resin porous film having on at least one surface thereof a porous coated layer containing a metal oxide, such as alumina, and a resin binder (PTLs 1 to 5). The coated layer is formed, for example, by coating and drying a slurry prepared by mixing alumina, a resin binder, and other components.

PTL 6 describes a slurry that contains inorganic oxide powder, such as α-alumina, satisfying the particular condition, a binder, and a solvent, and is for forming a porous film having insulating property on a surface of at least one of a positive electrode, a negative electrode, and a separator constituting a lithium ion secondary battery.

As a preparation method of a slurry containing alumina, PTL 7 describes a wet pulverization method for powder, such as alumina, by multi-stage pulverization with pulverization media having decreasing medium diameters used in sequence for providing a stable slurry with less change in viscosity even with the use of a small amount of dispersant, in which preliminary pulverization is performed in advance separately from the multi-stage pulverization, and in the multi-stage pulverization, the pulverization medium is switched to one having a smaller diameter at the prescribed timing.

PTL 8 describes a production method of an alumina organic solvent dispersion liquid excellent in dispersion stability with various organic solvents, in which metallic aluminum or a hydrolyzable aluminum compound is hydrolyzed in an organic solvent, and deflocculated in the presence of an acid to provide an alumina organic solvent dispersion liquid. In this method, metallic aluminum or a hydrolyzable aluminum compound is hydrolyzed with water in an amount of from 4 to 10 times by mol the amount of the metallic aluminum or the hydrolyzable aluminum compound to provide an alumina slurry, which is deflocculated in the presence of an organic sulfonic acid in an amount of from 0.01 to 0.2 time by mol the amount of the metallic aluminum or the hydrolyzable aluminum compound.

CITATION LIST

PTL 1: JP-A-2004-227972
PTL 2: JP-A-2008-186721
PTL 3: WO 2008/149986
PTL 4: JP-A-2008-305783
PTL 5: WO 2012/023199
PTL 6: JP-A-2013-168361
PTL 7: JP-A-2002-200432
PTL 8: JP-A-2008-31010

SUMMARY OF INVENTION

Technical Problem

For forming the coated layer on a porous film, a slurry containing alumina or the like dispersed in a dispersion medium is used, and inorganic particles, such as alumina, are liable to change in surface condition due to slight variation of the baking condition and the storing condition. Accordingly, there may be a problem that the slurry becomes instable in viscosity in long-term storage, and as a result, the productivity of the multilayer porous film becomes instable. In the case where the multilayer porous film is produced by using a coating liquid containing the slurry that is instable in viscosity, such a phenomenon or the like may occur that the surface smoothness of the multilayer porous film is considerably deteriorated due to the viscosity fluctuation of the coating liquid. The resulting film is deteriorated not only in appearance but also in conveying property, and there is a possibility that the handleability thereof is considerably deteriorated on cutting the film into sheets and stacking the sheets on each other.

PTL 6 is to provide inorganic oxide powder that is suitable for forming an inorganic oxide porous film excellent in ion permeability, heat resistance, and insulating property, but does not describe or suggest the enhancement of the viscosity stability of a slurry obtained therewith.

The method described in PTL 7 requires plural pulverization steps of powder, and thus is complicated.

PTL 8 relates to a production method of an alumina organic solvent dispersion liquid, in which an alumina slurry is once obtained, and then deflocculated to provide an alumina dispersion liquid having an alumina concentration of from 10 to 15% by weight and an average particle diameter of less than 0.1 µm. In the alumina slurry used for forming the coated layer of the multilayer porous film, the dispersion medium is preferably an aqueous medium, and the concentration of alumina in the slurry and the average particle diameter of alumina are preferably larger than those values. However, alumina having these properties is liable to undergo aggregation and sedimentation in a dispersion medium, and thus is expected to be deteriorated in long-term storage stability in the form of slurry.

An object of the present invention is to provide, on forming a slurry by dispersing alumina in an aqueous solvent, an alumina slurry that is excellent in viscosity stability in long-term storage by reducing aggregation of alumina.

Solution to Problem

The present inventors have found that the object can be achieved by an alumina slurry containing alumina that satisfies particular conditions dispersed in a dispersion medium, and thus the present invention has been completed.

Specifically, the present invention relates to the following.

[1] An alumina slurry containing alumina dispersed in a dispersion medium, the alumina having an average primary particle diameter of 0.1 µm or more and 1.0 µm or less, the alumina satisfying the following condition (1), and the slurry having a content of the alumina of 30% by mass or more and 70% by mass or less and a content of water in the dispersion medium of 50% by mass or more:

condition (1): in relationship of a pore diameter r1 (Å) and a pore volume Dv1 (mL/g) of the alumina measured by a nitrogen desorption method based on JIS Z8831-2 (2010), the pore volume Dv1(80) at r1=80 and the maximum value Dv1(M) of Dv1 in a range $20 \leq r1 \leq 80$ satisfy Dv1(M)>Dv1(80).

[2] The alumina slurry according to the item [1], wherein the alumina further satisfies the following condition (2):

condition (2): in relationship of a pore diameter r2 (Å) and a pore volume Dv2 (mL/g) of the alumina measured by a nitrogen adsorption method based on JIS Z8831-2 (2010), the pore volume Dv2(80) at r2=80 and the maximum value Dv2(M) of Dv2 in a range $20 \leq r2 \leq 80$ satisfy Dv2(M)>Dv2(80).

[3] The alumina slurry according to the item [1] or [2], wherein the dispersion medium contains a lower alcohol having from 1 to 4 carbon atoms in an amount in a range of 1% by mass or more and 20% by mass or less.

[4] A multilayer porous film containing a polyolefin resin porous film having on at least one surface thereof a coated layer, the coated layer being formed by using a dispersion liquid containing the alumina slurry according to any one of the items [1] to [3] and a resin binder.

[5] The multilayer porous film according to the item [4], wherein the resin binder is at least one selected from polyvinyl alcohol, polyvinylidene fluoride, carboxymethyl cellulose, polyacrylic acid, and a polyacrylic acid derivative.

[6] A separator for a nonaqueous electrolytic solution secondary battery, containing the multilayer porous film according to the item [4] or [5].

[7] A nonaqueous electrolytic solution secondary battery containing the separator for a nonaqueous electrolytic solution secondary battery according to the item [6].

Advantageous Effects of Invention

The alumina slurry of the present invention undergoes considerably small fluctuation in viscosity even in long-term storage, and thus the use of a dispersion liquid containing the slurry and a resin binder can form a uniform coated layer by a coating method in the production of a multilayer porous film containing a polyolefin resin porous film having on at least one surface thereof the coated layer, thereby stabilizing the productivity of the film. The multilayer porous film can be favorably used as a separator for a nonaqueous electrolytic solution secondary battery and the like.

DESCRIPTION OF EMBODIMENTS

An alumina slurry, a multilayer porous film, a separator for a nonaqueous electrolytic solution secondary battery, and a nonaqueous electrolytic solution secondary battery according to the present invention will be described in detail below.

In the present invention, the term "major component" encompasses such a meaning that other components are allowed to be contained in such a range that does not impair the function of the major component, and encompasses such a meaning that the content of the major component is 50% by mass or more, preferably 70% by mass or more, and particularly preferably 90% by mass or more (including 100% by mass), unless otherwise indicated.

The expression "from X to Y" (wherein X and Y each represent an arbitrary numeral) encompasses such a meaning that "X or more and Y or less" and also encompasses such a meaning that "preferably more than X" and "preferably less than Y", unless otherwise indicated.

Alumina Slurry

The alumina slurry of the present invention contains alumina dispersed in a dispersion medium, the alumina has an average primary particle diameter of 0.1 µm or more and 1.0 µm or less, the alumina satisfies the following condition (1), and the slurry has a content of the alumina of 30% by mass or more and 70% by mass or less and a content of water in the dispersion medium of 50% by mass or more:

condition (1): in relationship of a pore diameter r1 (Å) and a pore volume Dv1 (mL/g) of the alumina measured by a nitrogen desorption method based on JIS Z8831-2(2010), the pore volume Dv1(80) at r1=80 and the maximum value Dv1(M) of Dv1 in a range 20≤r1≤80 satisfy Dv1(M)>Dv1(80).

The alumina slurry of the present invention has the aforementioned constitution, and the use of the alumina satisfying the particular condition (1) achieves considerably small fluctuation of the viscosity even in long-term storage.

The components constituting the alumina slurry of the present invention will be described below.

Alumina

Examples of the alumina used in the alumina slurry of the present invention include α-alumina, γ-alumina, β-alumina, κ-alumina, and pseudoboehmite. Among these, α-alumina is preferred in the case where the alumina slurry of the present invention is used for a multilayer porous film for a separator for a nonaqueous electrolytic solution secondary battery since α-alumina is chemically inactive on installing in the battery.

The alumina used in the present invention has an average primary particle diameter of 0.1 µm or more and 1.0 µm or less. The average primary particle diameter of the alumina is preferably 0.2 µm or more, and more preferably 0.3 µm or more. The average primary particle diameter of the alumina is preferably 0.8 µm or less, and more preferably 0.7 µm or less. By using the alumina having an average primary particle diameter of 0.1 µm or more, the multilayer porous film having a coated layer containing the alumina can exhibit sufficient heat resistance. By using the alumina having an average primary particle diameter of 1.0 µm or less, the alumina has good dispersibility.

The average primary particle diameter alumina in the present invention can be measured and calculated by the method described in the example.

The alumina used in the present invention satisfies the condition (1). Specifically, in relationship of the pore diameter r1 (Å) and the pore volume Dv1 (mL/g) of the alumina measured by the nitrogen desorption method based on JIS Z8831-2 (2010), the pore volume Dv1(80) at r1=80 and the maximum value Dv1(M) of Dv1 in a range 20≤r1≤80 satisfy Dv1(M)>Dv1(80). By using the alumina satisfying the condition (1), the alumina slurry of the present invention becomes excellent in viscosity stability in long-term storage. When the value of Dv1(M) is the value of Dv1(80) or less, the fluctuation of the viscosity of the alumina slurry in long-term storage is increased, the slurry, the dispersion liquid containing the slurry, and the multilayer porous film obtained by using the dispersion liquid are deteriorated in productivity.

From the standpoint of the achievement of the effect, Dv1(80) is preferably in a range of from 0.001 to 0.01 mL/g, more preferably from 0.002 to 0.01 mL/g, and further preferably from 0.003 to 0.01 mL/g, and Dv1(M) is preferably in a range of from 0.003 to 0.05 mL/g, more preferably from 0.004 to 0.05 mL/g, and further preferably from 0.005 to 0.05 mL/g.

The pore diameter r1 and the pore volumes Dv1(M) and Dv1(80) of the alumina are values measured by the nitrogen desorption method based on JIS Z8831-2 (2010).

The value of Dv1(80)/Dv1(M), which is a ratio of Dv1(M) and Dv1(80), is less than 1.00, preferably 0.90 or less, more preferably 0.85 or less, and further preferably 0.80 or less. The lower limit of the value is not particularly limited, and is preferably 0.20 or more, more preferably 0.25 or more, and further preferably 0.30 or more.

When the value of Dv1(80)/Dv1(M) is in the range, the alumina slurry of the present invention becomes excellent in viscosity stability in long-term storage.

The alumina preferably further satisfies the following condition (2) from the standpoint of the viscosity stability of the resulting alumina slurry in long-term storage.

Condition (2): In relationship of the pore diameter r2 (Å) and the pore volume Dv2 (mL/g) of the alumina measured by the nitrogen adsorption method based on JIS Z8831-2 (2010), the pore volume Dv2(80) at r2=80 and the maximum value Dv2(M) of Dv2 in a range 20≤r2≤80 satisfy Dv2(M)>Dv2(80).

By using the alumina satisfying the condition (2), the alumina slurry of the present invention can become further excellent in viscosity stability in long-term storage. From the standpoint of the achievement of the effect, Dv2(80) is preferably in a range of from 0.001 to 0.01 mL/g, more preferably from 0.002 to 0.01 mL/g, and further preferably from 0.003 to 0.01 mL/g, and Dv2(M) is preferably in a range of from 0.005 to 0.03 mL/g, more preferably from 0.006 to 0.03 mL/g, and further preferably from 0.007 to 0.03 mL/g.

The pore diameter r2 and the pore volumes Dv2(M) and Dv2(80) of the alumina are values measured by the nitrogen adsorption method based on JIS Z8831-2 (2010).

The value of Dv2(80)/Dv2(M), which is a ratio of Dv2(M) and Dv2(80), is preferably less than 1.00, more preferably 0.95 or less, and further preferably 0.90 or less. The lower limit of the value is not particularly limited, and is preferably 0.20 or more, more preferably 0.40 or more, and further preferably 0.60 or more.

When the value of Dv2(80)/Dv2(M) is in the range, the alumina slurry of the present invention can become excellent in viscosity stability in long-term storage.

Alumina that satisfies the condition (1) and preferably further satisfies the condition (2) can be appropriately selected and used in the alumina slurry of the present invention. Alumina that satisfies the condition (1) and preferably further satisfies the condition (2) may be prepared by treating alumina that does not satisfy the conditions under a high-temperature and high-humidity condition, and such alumina may be used in the alumina slurry of the present invention. The treating condition is preferably a temperature of from 60 to 100° C. and a relative humidity of from 50 to 100%, and more preferably a temperature of from 70 to 100° C. and a relative humidity of from 60 to 90%. The treating time can be appropriately selected within such a range that provides alumina that satisfies the condition (1) and preferably further satisfies the condition (2).

The mechanism of the formation of the alumina that satisfies the condition (1) and preferably further satisfies the condition (2) and is excellent in viscosity stability after forming into a slurry, by the treating method is not clear, but can be expected as follows.

When alumina is humidified under a high-temperature condition, transition alumina other than α-alumina contained in the alumina undergoes volume change to expand the pores. It is considered that, associated therewith, water molecules are hydrogen-bonded to a part of the hydroxyl groups on the surface of the alumina through the humidification to decrease the activity of the hydroxyl groups, and as a result, the viscosity stability after forming into a slurry is enhanced.

The alumina used in the present invention preferably has a specific surface area of 5.0 m$^2$/g or more and 15.0 m$^2$/g or less. When the specific surface area is 5.0 m$^2$/g or more, the resulting alumina slurry can be enhanced in viscosity stability in long-term storage. Furthermore, on installing the multilayer porous film obtained by using the alumina slurry of the present invention as a separator in a nonaqueous electrolytic solution secondary battery, the penetration of the electrolytic solution can be facilitated to enhance the productivity of the nonaqueous electrolytic solution secondary battery. When the specific surface area is 15.0 m$^2$/g or less, on installing the multilayer porous film of the present invention as a separator in a nonaqueous electrolytic solution secondary battery, the components of the electrolytic solution can be prevented from being adsorbed.

In this point of view, the specific surface area of the alumina is more preferably 5.5 m$^2$/g or more, and further preferably 6.0 m$^2$/g or more, and is more preferably 13.0 m$^2$/g or less, and further preferably 11.0 m$^2$/g or less.

The specific surface area of the alumina in the present invention is a value measured by a constant volume gas adsorption method, and specifically can be measured by the method described in the example.

Dispersion Medium

The alumina slurry of the present invention contains the alumina dispersed in a dispersion medium. The dispersion medium is not particularly limited as far as the dispersion medium is capable of dispersing the alumina moderately uniformly and stably, and the dispersion medium has a water content in the dispersion medium of 50% by mass or more, preferably 70% by mass or more, more preferably 80% by mass or more, and further preferably 85% by mass or more, from the standpoint of the cost and the environmental load, and the viscosity stability of the alumina slurry in long-term storage, and in the case where the alumina slurry is used for forming the coated layer in the multilayer porous film described later, from the standpoint of the coating property thereof on forming the coated layer by a coating method. The water content of the dispersion medium is 100% by mass or less, preferably 99% by mass or less, and more preferably 95% by mass or less.

Examples of the dispersion medium capable of being used other than water include N-methylpyrrolidone, N,N-dimethylformamide, N,N-dimethylacetamide, water, dioxane, acetonitrile, a lower alcohol, a glycol compound, glycerin, and a lactate ester. Among these, a lower alcohol having from 1 to 4 carbon atoms is preferably contained as the dispersion medium. The lower alcohol is preferably a monohydric alcohol having from 1 to 4 carbon atoms, and at least one selected from methanol, ethanol, and isopropyl alcohol is more preferred. These compounds may be used solely or as a combination of two or more kinds thereof.

Among the aforementioned compounds, the dispersion medium is preferably a mixed dispersion medium of water and a lower alcohol having from 1 to 4 carbon atoms, more preferably a mixed dispersion medium of water and a monohydric alcohol having from 1 to 4 carbon atoms, and further preferably a mixed dispersion medium of water and isopropyl alcohol.

The content of the lower alcohol having from 1 to 4 carbon atoms in the dispersion medium is preferably in a range of 1% by mass or more, and more preferably 5% by mass or more, and is preferably 20% by mass or less, and more preferably 15% by mass or less.

The alumina slurry of the present invention has a content of the alumina of 30% by mass or more, preferably 40% by mass or more, and more preferably 45% by mass or more, from the standpoint of the coating property and the quick drying property of the coating liquid using the alumina slurry. The alumina slurry has a content of the alumina of 70% by mass or less, preferably 65% by mass or less, and more preferably 60% by mass or less, from the standpoint of the viscosity stability of the alumina slurry in long-term storage and the handleability thereof.

Production Method of Alumina Slurry

The production method for the alumina slurry of the present invention is not particularly limited, and examples thereof include a method of mixing prescribed amounts of the alumina and the dispersion medium, and subjecting the mixture to a dispersing treatment. The method of the dispersing treatment is not particularly limited, and examples thereof include a mechanical agitation method with a ball mill, a bead mill, a planetary ball mill, a vibration ball mill, a sand mill, a colloid mill, an attritor, a roll mill, a high-speed impeller dispersing device, a disperser, a homogenizer, a high-speed impact mill, an ultrasonic dispersing device, an agitation blade dispersing device or the like. Among these, the dispersing treatment is preferably performed with a bead mill from the standpoint of the prevention of contamination with ground products.

Examples of the beads used in the bead mill include glass beads and ceramic beads. Ceramic beads are preferred, and one or more kinds of ceramic beads selected from titania, alumina, zirconia, and zircon, from the standpoint of the hardness of the beads. The bead diameter is preferably 0.1 mm or more and 3 mm or less, and from the standpoint of the dispersibility of the alumina, is more preferably 1.5 mm or less, and further preferably 0.8 mm or less.

The filling rate of the beads in the bead mill is preferably 30% or more, more preferably 50% or more, and further preferably 70% or more, and is preferably 90% or less, from the standpoint of the dispersion efficiency.

The temperature and the average retention time in the dispersing treatment are not particularly limited, and for example, in the case where the dispersion is continuously performed with the bead mill, the dispersing treatment may be generally performed at a temperature of from 10 to 50° C. for an average retention time of from 0.1 to 60 minutes.

The alumina slurry of the present invention is excellent in viscosity stability in long-term storage. Specifically, in the case where the alumina slurry, which is obtained by mixing the alumina and the dispersion medium, and subjecting the mixture to a dispersing treatment, is measured for viscosity with a B-type viscometer ("TVB10H", produced by Toki Sangyo Co., Ltd.) at a temperature of 25° C. and a circumferential speed of 100 rpm, both the value of the ratio $\eta_{24}/\eta_1$ of the slurry viscosity after standing for 24 hours $\eta_{24}$ to the slurry viscosity after standing for 1 hour $\eta_1$ and the value of the ratio $\eta_{72}/\eta_1$ of the slurry viscosity after standing for 72 hours $\eta_{72}$ thereto are preferably less than 10, more preferably less than 5, and further preferably less than 3. Both the value of $\eta_{24}/\eta_1$ and the value of $\eta_{72}/\eta_1$ are preferably 0.1 or more, more preferably 0.2 or more, and further preferably 0.3 or more.

Both the values of $\eta_{24}$ and $\eta_{72}$ above are preferably in a range of from 10 to 4,000 mPa·s, more preferably in a range of from 15 to 3,800 mPa·s, and further preferably in a range of from 20 to 3,600 mPa·s.

When the values of $\eta_{24}/\eta_1$ and $\eta_{72}/\eta_1$ and the values of $\eta_{24}$ and $\eta_{72}$ are in the ranges, the alumina slurry can have sufficient viscosity stability in long-term storage, and the productivity thereof can be stabilized in the case where the slurry is used for forming a coated layer of a multilayer porous film. Furthermore, the coating property thereof in the formation of the coated layer can also be enhanced.

The alumina slurry of the present invention may be applied to an abrasive material, the molding of a ceramic molded article, the formation of a coated layer of an electrode or a separator of a nonaqueous electrolytic solution secondary battery, the formation of a reflective layer of a light reflecting material, and the like. In particular, the alumina slurry is favorably applied to the formation of the coated layer of the multilayer porous film described later.

Multilayer Porous Film

The multilayer porous film of the present invention contains a polyolefin resin porous film having on at least one surface thereof a coated layer, and the coated layer is formed by using a dispersion liquid containing the alumina slurry of the present invention and a resin binder described later.

The components constituting the multilayer porous film of the present invention will be described below.

Polyolefin Resin Porous Film

The multilayer porous film of the present invention contains a polyolefin resin porous film from the standpoint of the chemical stability of the inside of a battery and the like.

Examples of the polyolefin resin used in the polyolefin resin porous film include a homopolymer and a copolymer obtained by polymerizing an α-olefin, such as ethylene, propylene, 1-butene, 4-methyl-1-pentene, and 1-hexene. Two or more kinds of the homopolymer and the copolymer may be mixed. Among these, a polypropylene resin and a polyethylene resin are preferably used, and a polypropylene resin is particularly preferably used from the standpoint of the maintenance of the mechanical strength, the heat resistance and the like of the multilayer porous film of the present invention.

Polypropylene Resin

Examples of the polypropylene resin capable of being used in the polyolefin resin porous film include homopolypropylene (i.e., a propylene homopolymer), and a random copolymer and a block copolymer of propylene with an α-olefin, such as ethylene, 1-butene, 1-pentene, 1-hexene, 1-heptene, 1-octene, 1-nonene, and 1-decene. Among these, homopolypropylene is particularly preferably used from the standpoint of the maintenance of the mechanical strength, the heat resistance and the like of the multilayer porous film of the present invention.

The polypropylene resin preferably has an isotactic pentad fraction (mmmm fraction), which shows the stereoregularity, of from 80 to 99%, more preferably from 83 to 98%, and further preferably from 85 to 97%. When the isotactic pentad fraction is 80% or more, the film can have a good mechanical strength. The upper limit of the isotactic pentad fraction may be determined by the upper limit that can be obtained industrially in the current state of art, but is not limited thereto in the case where a resin having a higher regularity is industrially developed in the future.

The isotactic pentad fraction (mmmm fraction) means such a steric configuration or a ratio thereof that with respect to a carbon-carbon main chain constituted by arbitrary sequential five propylene units, the five methyl groups as side chains thereof are on the same side. The signal assignment of the methyl groups is in accordance with A. Zambelli, et al., Macromolecules, vol. 8, p. 687 (1975).

The polypropylene resin preferably has $M_w/M_n$, which is a parameter indicating the molecular weight distribution thereof, of from 2.0 to 10.0, more preferably from 2.0 to 8.0, and further preferably from 2.0 to 6.0. While a smaller value of $M_w/M_n$ means a narrower molecular weight distribution, the resin that has $M_w/M_n$ of less than 2.0 may have such problems as deteriorated extrusion moldability, and may have a difficulty in industrial production. The resin that has $M_w/M_n$ exceeding 10.0 may contain an increased amount of a low molecular weight component, and thereby the mechanical strength of the multilayer porous film is liable to be lowered.

The $M_w/M_n$ of the polypropylene resin may be measured by GPC (gel permeation chromatography).

The polypropylene resin preferably has a density of from 0.890 to 0.970 g/cm$^3$, more preferably from 0.895 to 0.970 g/cm$^3$, and further preferably from 0.900 to 0.970 g/cm$^3$. The density of 0.890 g/cm$^3$ or more is preferred since the multilayer porous film can exhibit suitable SD characteristics in the use thereof as a separator for a nonaqueous electrolytic solution secondary battery. The density of 0.970 g/cm$^3$ or less is preferred since suitable SD characteristics can be exhibited and the stretching property thereof can be retained.

The density of the polypropylene resin is measured by a density gradient tube method according to JIS K7112 (1999).

The melt flow rate (MFR) of the polypropylene resin is not particularly limited, and in general, the MFR is preferably from 0.5 to 15 g/10 min, and more preferably from 1.0 to 10 g/10 min. When the MFR is 0.5 g/10 min or more, the melt viscosity of the resin on molding can became high, and sufficient productivity can be ensured. When the MFR is 15 g/10 min or less, the mechanical strength of the resulting multilayer porous film can be sufficiently retained.

The MFR of the polypropylene resin is measured according to JIS K7210 (1999) under conditions of a temperature of 230° C. and a load of 2.16 kg.

The production method of the polypropylene resin is not particularly limited, and examples thereof include a known polymerization method using a known olefin polymerization catalyst, such as a suspension polymerization method, a melt polymerization method, a bulk polymerization method, and a gas phase polymerization method using a multi-site catalyst, such as a Ziegler-Natta catalyst, or a single site catalyst, such as a metallocene catalyst, and a bulk polymerization method using a radical initiator.

Examples of the commercially available products capable of being used as the polypropylene resin include "Novatec PP" and "Wintec" (produced by Nippon Polypropylene Corporation), "Notio" and "Tafmer XR" (produced by Mitsui Chemicals, Inc.), "Zelas" and "Thermorun" (produced by Mitsubishi Chemical Corporation), "Sumitomo Nobrene" and "Tafcelene" (produced by Sumitomo Chemical Co., Ltd.), "Primepolypro" and "Prime TPO" (produced by Prime Polymer Co., Ltd.), "Adflex", "Adsyl", and "HMS-PP (PF814)" (produced by Sunallomer Ltd.), and "Versify" and "Inspire" (produced by Dow Chemical Company).

Polyethylene Resin

Examples of the polyethylene resin capable of being used in the polyolefin resin porous film include low density polyethylene, linear low density polyethylene, linear super low density polyethylene, medium density polyethylene, high density polyethylene, and a copolymer containing ethylene as a major component, such as a copolymer or a multicomponent copolymer of ethylene with one kind or two or more kinds of comonomers selected from an α-olefin having from 3 to 10 carbon atoms, such as propylene, 1-butene, 1-pentene, 1-hexene, 1-heptene, and 1-octene; a vinyl ester, such as vinyl acetate and vinyl propionate; an unsaturated carboxylate ester, such as methyl acrylate, ethyl acrylate, methyl methacrylate, and ethyl methacrylate; and an unsaturated compound, such as a conjugated diene and a non-conjugated diene, or a mixed composition thereof. The content of the ethylene unit of the ethylene polymer generally exceeds 50% by mass.

Among the polyethylene resins, at least one polyethylene resin selected from low density polyethylene, linear low density polyethylene, and high density polyethylene is preferred, and high density polyethylene is more preferred.

The polyethylene resin preferably has a density of from 0.910 to 0.970 g/cm$^3$, more preferably from 0.930 to 0.970 g/cm$^3$, and further preferably from 0.940 to 0.970 g/cm$^3$. The density of 0.910 g/cm$^3$ or more is preferred since the multilayer porous film can exhibit suitable SD characteristics in the use thereof as a separator for a nonaqueous electrolytic solution secondary battery. The density of 0.970 g/cm$^3$ or less is preferred since suitable SD characteristics can be exhibited, and the stretching property thereof can be retained.

The density of the polyethylene resin is measured by a density gradient tube method according to JIS K7112 (1999).

The melt flow rate (MFR) of the polyethylene resin is not particularly limited, and in general, the MFR is preferably from 0.03 to 30 g/10 min, and more preferably from 0.3 to 10 g/10 min. When the MFR is 0.03 g/10 min or more, the melt viscosity of the resin on molding can became sufficiently low and excellent productivity can be obtained. When the MFR is 30 g/10 min or less, a sufficient mechanical strength can be obtained.

The MFR of the polyethylene resin is measured according to JIS K7210 (1999) under conditions of a temperature of 190° C. and a load of 2.16 kg.

The production method of the polyethylene resin is not particularly limited, and examples thereof include a known polymerization method using a known olefin polymerization catalyst, such as a polymerization method using a multi-site catalyst, such as a Ziegler-Natta catalyst, or a single site catalyst, such as a metallocene catalyst. The polymerization method of the polyethylene resin includes one-stage polymerization, two-stage polymerization, and multi-stage polymerization containing more than two stages, and a polyethylene resin formed by any one of these methods may be used.

Other Components

The polyolefin resin porous film may contain, in addition to the aforementioned resin, an additive that is generally added to a resin in such a range that does not significantly impair the effects of the present invention.

Examples of the additive include a recycled resin, which is formed from trimming loss, such as waste edges, and the like; inorganic particles, such as silica, talc, kaolin, and calcium carbonate; a pigment, such as carbon black; and an additive, such as a flame retardant, a weather resistance stabilizer, a heat resistance stabilizer, an antistatic agent, a melt viscosity modifier, a crosslinking agent, a lubricant, a nucleating agent, a plasticizer, an antiaging agent, an antioxidant, a light stabilizer, an ultraviolet ray absorbent, a neutralizing agent, an anti-fogging agent, an anti-blocking agent, a slipping agent, and a colorant, which are added for improving or modifying the molding processability, the productivity and the properties of the polyolefin resin porous film.

Various resins and a low molecular weight compound, such as wax, may be added for facilitating pore opening of the polyolefin resin porous film and for imparting molding processability thereto, in such a range that does not significantly impair the effects of the present invention.

Layer Structure of Polyolefin Resin Porous Film

The polyolefin resin porous film may have a single layer structure or a multilayer structure. Preferred examples among these include a single layer structure of a layer containing the polyolefin resin (which may be hereinafter referred to as a layer A), and a multilayer structure containing the layer A and an additional layer (which may be hereinafter referred to as a layer B) that does not impair the function of the layer A. The layer B may be a layer containing a polyolefin resin that is different from that of the layer A.

Specific examples thereof include a two-layer structure containing the layer A and the layer B laminated on each other, and a three-layer structure containing the layer A, the layer B, and the layer A, or containing the layer B, the layer A, and the layer B, laminated on each other. A three-layer structure containing three kinds of layers formed by combining a layer having another function may be used. In this case, the layer having another function and the order of lamination are not particularly limited. The number of layers may be increased depending on necessity, such as 4 layers, 5 layers, 6 layers, 7 layers, and so on.

Production Method of Polyolefin Resin Porous Layer

The production method of the polyolefin resin porous film is not particularly limited, and a known production method of a porous film may be favorably used. In general, such a method is preferred that a non-porous film product, which is a precursor for forming the polyolefin resin porous film, is produced, and then porosified to produce the polyolefin resin porous film.

The production method of the non-porous film product as a precursor for forming the polyolefin resin porous film is not particularly limited, and a known method may be used. For example, the polyolefin resin as a raw material of the porous film or a mixture of the polyolefin resin and various additives is melted and extruded from a T-die by using an extruder, and then solidified by cooling with a casting roll. Such a method may also be used that a film product produced by a tubular method is cut open into a flat film.

The porosification method of the non-porous film product is not particularly limited, and a known method may be used, such as a wet porosification method by uniaxial or higher multi-axial stretching and a dry porosification method by uniaxial or higher multi-axial stretching. The stretching method in the stretching porosification includes a roll stretching method, a press stretching method, a tenter stretching method, a simultaneous biaxially stretching method, and the like, and uniaxial stretching or biaxial stretching may be performed by one of these methods or a combination of two or more of these methods. Among these, a sequential biaxial stretching method is preferred from the standpoint of the control of the porous structure. Furthermore, such a method may also be used depending on necessity that before and/or after stretching, a plasticizer contained in the resin composition is extracted with a solvent, followed by drying. Moreover, for improving the dimensional stability, a heat treatment or a relaxation treatment may be performed after stretching.

In the case where a polypropylene resin is used in the polyolefin resin porous film, so-called β-crystals are preferably formed in the non-porous film product. In the case where β-crystals are formed in the non-porous film product, fine pores can be easily formed by stretching even though an additive, such as a filler, is not used, and thus the polyolefin resin porous film that has excellent air permeation characteristics can be obtained.

Examples of the method of forming β-crystals in the non-porous film product of the polypropylene resin include a method of not adding a substance that accelerates formation of α-crystals of the polypropylene resin, a method of adding polypropylene that has been subjected to a treatment of generating peroxide radicals as described in Japanese Patent No. 3,739,481, and a method of adding a β-crystal nucleating agent to the composition.

β-Crystal Nucleating Agent

Examples of the β-crystal nucleating agent capable of being used in the present invention are shown below, but the β-crystal nucleating agent is not particularly limited as far as a compound increases formation and growth of β-crystals of the polypropylene resin. Two or more kinds of the β-crystal nucleating agent may be used in combination.

Examples of the β-crystal nucleating agent include an amide compound; a tetraoxaspiro compound; quinacridones; iron oxide having a nano scale size; an alkali metal or an alkaline earth metal salt of a carboxylic acid, such as 1,2-hydroxystearic acid potassium salt, magnesium benzoate, magnesium succinate, and magnesium phthalate; an aromatic sulfonic acid compound, such as sodium benzenesulfonate and sodium naphthalenesulfonate; a diester or triester of a dibasic or tribasic carboxylic acid; a phthalocyanine pigment, such as phthalocyanine blue; a two-component compound containing an organic dibasic acid as a component A and an oxide, a hydroxide, or a salt of a metal of Group 2 of the periodic table as a component B; and a composition containing a cyclic phosphorus compound and a magnesium compound. Specific examples of the kind of the other nucleating agents are described in JP-A-2003-306585, JP-A-08-144122, and JP-A-09-194650.

Examples of the commercially available product of the β-crystal nucleating agent include "NJSTAR NU-100", produced by New Japan Chemical Co., Ltd. Examples of the commercially available product of the polypropylene resin having the β-crystal nucleating agent added thereto include a polypropylene resin "Bepol B-022SP", produced by Aristech Surfaces LLC, a polypropylene resin "Beta(β)-PP BE60-7032", produced by Borealis AG, and a polypropylene resin "BNX BETAPP-LN", produced by Mayzo, Inc.

The mixing ratio of the β-crystal nucleating agent added to the polypropylene resin constituting the polyolefin resin porous film is necessarily controlled appropriately depending on the kind of the β-crystal nucleating agent, the composition of the polypropylene resin, and the like, and is preferably from 0.0001 to 5 parts by mass, more preferably from 0.001 to 3 parts by mass, and further preferably from 0.01 to 1 part by mass, per 100 parts by mass of the polypropylene resin.

When the mixing ratio of the β-crystal nucleating agent is 0.0001 part by mass or more per 100 parts by mass of the polypropylene resin, β-crystals of the polypropylene resin can be sufficiently formed and grown in the production, and therefore the resulting multilayer porous film can exhibit the β-crystal activity on using the multilayer porous film as a separator for a nonaqueous electrolytic solution secondary battery, so as to provide an intended air permeation capability. The mixing ratio of the β-crystal nucleating agent that is 5 parts by mass or less per 100 parts by mass of the polypropylene resin is preferred since good cost efficiency can be obtained and bleeding of the β-crystal nucleating agent to the surface of the polyolefin resin porous film is not caused.

In the case where the polyolefin resin porous film has a multilayer structure, the production method thereof may be roughly classified into the following three methods depending on the order of the porosification and the lamination, and the like.

(i) The layers are porosified, and then the porosified layers are laminated or adhered with an adhesive.

(ii) The layers are laminated to produce a multilayer non-porous film product, and then the non-porous film product is porosified.

(iii) Any one of the layers is porosified and then laminated with another non-porous film product, and the layers are porosified.

In the present invention, the method (ii) is preferably used from the standpoint of the simplicity of the process and the productivity, and for ensuring the interlayer adhesiveness between the two layers, such a method is particularly preferred that a multilayer non-porous film product is produced by co-extrusion, and then porosified.

The thickness of the polyolefin resin porous film is preferably from 5 to 100 μm, more preferably from 8 to 50 μm, and further preferably from 10 to 30 μm. When the thickness of the polyolefin resin porous film is 5 μm or more, in the case where the multilayer porous film of the present invention is used as a separator for a nonaqueous electrolytic solution secondary battery, electric insulating property that is substantially necessary can be obtained, and even in the case, for example, where a protruded portion of an electrode receives a large force, the separator can be prevented from being broken thereby, thereby providing excellent safety. When the thickness of the polyolefin resin porous film is 100 μm or less, in the case where the multilayer porous film of the present invention is used as a separator for a nonaqueous electrolytic solution secondary battery, the electric resistance can be made small, and thereby the capability of the battery can be sufficiently ensured.

Coated Layer

The multilayer porous film of the present invention has a coated layer on at least one surface of the polyolefin resin porous film. The coated layer is formed by using a dispersion liquid containing the alumina slurry of the present invention and a resin binder (which may be hereinafter referred to as a dispersion liquid for forming a coated layer), and contains at least alumina and a resin binder. The alumina slurry used in the dispersion liquid is as described above.

Resin Binder

The resin binder functions as a binding agent of alumina in the coated layer, and is used for enhancing the adhesiveness between the coated layer containing a large amount of alumina and the polyolefin resin porous film.

The resin binder used in the coated layer is not particularly limited as far as the resin binder favorably adheres the coated layer containing a large amount of alumina and the polyolefin resin porous film, is electrochemically stable, and is stable against an organic electrolytic solution on using the multilayer porous film as a separator for a nonaqueous electrolytic solution secondary battery.

Specific examples thereof include polyether, polyamide, polyimide, polyamideimide, polyaramid, polyoxyethylene, an ethylene-vinyl acetate copolymer (having an amount of the structural unit derived from vinyl acetate of from 0 to 20% by mol), an ethylene-acrylic acid copolymer, such as an ethylene-ethyl acrylate copolymer, polyvinylidene fluoride, poly(vinylidene fluoride-hexafluoropropylene), poly(vinylidene fluoride-trichloroethylene), polytetrafluoroethylene, fluorine rubber, styrene-butadiene rubber, nitrile-butadiene rubber, polybutadiene rubber, polyacrylonitrile, polyacrylic acid and a derivative thereof, polymethacrylic acid and a derivative thereof, carboxymethyl cellulose, hydroxyethyl cellulose, cyanoethyl cellulose, polyvinyl alcohol, cyanoethyl polyvinyl alcohol, polyvinylbutyral, polyvinylpyrrolidone, poly-N-vinylacetamide, a crosslinked acrylic resin, polyurethane, an epoxy resin, and maleic acid-modified polyolefin. The resin binder may be used solely or as a combination of two or more kinds thereof.

Among these, polyoxyethylene, polyvinyl alcohol, polyvinylidene fluoride, polyvinylpyrrolidone, a polyacrylonitrile resin, styrene-butadiene rubber, carboxymethyl cellulose, polyacrylic acid and a derivative thereof, and maleic acid-modified polyolefin are preferred, and at least one selected from polyvinyl alcohol, polyvinylidene fluoride, carboxymethyl cellulose, polyacrylic acid, and a polyacrylic acid derivative is more preferred, since these compounds are relatively stable in the dispersion medium containing water as a major component and in the electrolytic solution present in the inside of the battery.

In the coated layer, the content of the alumina based on the total amount of the alumina and the resin binder is preferably in a range of 80% by mass or more and 99.9% by mass or less, and the content of the alumina is more preferably 92% by mass or more, further preferably 95% by mass or more, and particularly preferably 98% by mass or more. When the content of the alumina based on the total amount of the alumina and resin binder is in the range, the coated layer can exhibit excellent air permeation property, and the binding property for the alumina can be retained.

Accordingly, the dispersion liquid for forming a coated layer preferably contains the alumina slurry and the resin binder in such a manner that the ratio of the alumina and the resin binder is in the aforementioned range.

Acid Component

The dispersion liquid for forming a coated layer preferably contains an acid component. The incorporation of the acid component suppresses aggregation of alumina in the dispersion liquid for forming a coated layer so that the viscosity stability of the dispersion liquid in long-term storage is enhanced, whereby a uniform coated layer can be provided.

The acid component may remain as an acid in the coated layer, and may remain therein as a salt formed through reaction with an alkaline impurity in the coated layer.

The acid component preferably has a first acid dissociation constant ($pK_{a1}$) of 5 or less and preferably has no second acid dissociation constant ($pK_{a2}$) or that of 7 or more in a diluted aqueous solution at 25° C. Examples of the acid component that has the properties include a lower primary carboxylic acid, such as formic acid, acetic acid, propionic acid, and an acrylic acid; a nitro acid, such as nitric acid and nitrous acid; a halogen oxoacid, such as perchloric acid and hypochlorous acid; a halide ion, such as hydrochloric acid, hydrofluoric acid, and hydrobromic acid; phosphoric acid, salicylic acid, glycolic acid, lactic acid, ascorbic acid, and erythorbic acid. These compounds may be used solely or as a combination of two or more kinds thereof. Among these, at least one selected from formic acid, acetic acid, nitric acid, hydrochloric acid, and phosphoric acid is preferred from the standpoint of the capability of lowering the pH with a small amount thereof, the availability and the stability of the acid. The acid component that satisfies the aforementioned condition can suppress aggregation of the alumina to enhance the viscosity stability of the dispersion liquid for forming a coated layer in long-term storage.

The dispersion liquid for forming a coated layer preferably contains the acid component in an amount in a range of 10 ppm by mass or more and 10,000 ppm by mass or less. The amount of the acid component mixed is more preferably 100 ppm by mass or more and 9,000 ppm by mass or less, and further preferably 1,000 ppm by mass or more and 8,000 ppm by mass or less.

When the amount of the acid component mixed in the dispersion liquid for forming a coated layer is 10 ppm by mass or more, a dispersion liquid that is excellent in viscosity stability in long-term storage can be obtained, thereby obtaining a uniform coated layer. When the amount of the acid component mixed is 10,000 ppm by mass or less, even in the case where the multilayer porous film having the coated layer is used as a separator for a nonaqueous electrolytic solution secondary battery, the performance of the nonaqueous electrolytic solution secondary battery is not adversely affected.

The dispersion liquid for forming a coated layer may further contain a dispersion assistant, a stabilizer, a thickener, and the like for enhancing the dispersion stability and optimizing the viscosity to the formation of the coated layer. A dispersion medium may further be added. The dispersion medium to be added is preferably capable of dissolving or dispersing the alumina, the resin binder, and the other components moderately, uniformly and stably, and examples thereof include those described for the dispersion medium of the alumina slurry.

The dispersion liquid for forming a coated layer may be prepared, for example, by mixing the alumina slurry of the present invention, the resin binder, and depending on necessity the other components, and the mixture is further subjected to a dispersion treatment depending on necessity. The methods for mixing and the dispersion treatment for the components contained in the dispersion liquid for forming a coated layer may be the same methods as in the production method described for the alumina slurry.

Formation Method of Coated Layer

The coated layer is formed by using the dispersion liquid for forming a coated layer described above. Examples of the formation method of the coated layer include a co-extrusion method, a lamination method, and a coating method, and a coating method is preferably used from the standpoint of the continuous productivity. Specifically, the coated layer is preferably formed by coating the dispersion liquid for forming a coated layer on at least one surface of the polyolefin resin porous film.

The dispersion liquid for forming a coated layer may be coated only on one surface of the polyolefin resin porous film or may be coated on both surfaces thereof depending on the purpose. Accordingly, in the multilayer porous film of the present invention, the coated layer may be formed only on one surface of the polyolefin resin porous film or may be formed on both surfaces thereof.

The coating method of the dispersion liquid for forming a coated layer is not particularly limited as far as the method achieves the necessary thickness of the layer and the necessary coated area thereof. Examples thereof include a gravure coater method, a microgravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, and a spray coating method.

The step of coating the dispersion liquid for forming a coated layer on the surface of the polyolefin resin porous film may be performed in the course of the production process of the polyolefin resin porous film. For example, the coating step may be performed after the extrusion molding of the polyolefin resin film and before the stretching step, and may be performed after the stretching step in the longitudinal direction or after the stretching step in the transverse direction.

After coating the dispersion liquid for forming a coated layer, a step of removing the dispersion medium is preferably performed. According to the procedure, the coated layer containing the alumina and the resin binder can be formed on the polyolefin resin porous film. The method of removing the dispersion medium is not particularly limited as far as the method does not adversely affect the polyolefin resin porous film. Examples thereof include a method of drying at a temperature lower than the melting point of the polyolefin resin porous film while fixing the film, a method of drying under reduced pressure at a low temperature, and a method of immersing the film in a poor solvent to the resin binder, thereby solidifying the resin binder and simultaneously extracting the solvent.

It is preferred that the coated layer is formed on the polyolefin resin porous film, and thereby the multilayer porous film of the present invention is produced.

Shape and Properties of Multilayer Porous Film

The total thickness of the multilayer porous film of the present invention may be appropriately selected depending on the purpose. In the case where the multilayer porous film is used as a separator for a nonaqueous electrolytic solution secondary battery, the total thickness of the multilayer porous film is preferably from 5 to 100 μm, more preferably from 8 to 50 μm, and further preferably from 10 to 30 μm. When the total thickness is 5 μm or more, electric insulating property that is substantially necessary as a separator for a nonaqueous electrolytic solution secondary battery can be obtained, and even in the case, for example, where a protruded portion of an electrode receives a large force, the separator for a nonaqueous electrolytic solution secondary battery can be prevented from being broken, thereby providing excellent safety. When the total thickness of the multilayer porous film is 100 μm or less, the electric resistance of the multilayer porous film can be made small, and thereby the capability of the battery can be sufficiently ensured.

The thickness of the coated layer in the multilayer porous film is preferably 0.5 μm or more, more preferably 1 μm or more, further preferably 2 μm or more, and particularly preferably 3 μm or more, from the standpoint of the heat resistance. The thickness of the coated layer is preferably 90 μm or less, more preferably 50 μm or less, further preferably 30 μm or less, and particularly preferably 10 μm or less, from the standpoint of ensuring the continuity and imparting excellent air permeability. In the case where two or more coated layers are provided, the thickness of the coated layer herein means the thickness per one layer.

The multilayer porous film of the present invention preferably has a porosity of 30% or more, more preferably 35% or more, and further preferably 40% or more. When the porosity is 30% or more, the multilayer film can have continuity ensured and excellent air permeability.

The porosity of the multilayer porous film is preferably 70% or less, more preferably 65% or less, and further preferably 60% or less. When the porosity is 70% or less, the multilayer porous film can have a sufficient strength, which is also preferred from the standpoint of the handleability.

The multilayer porous film of the present invention preferably has an air permeability of 1,000 sec/100 mL or less, more preferably from 10 to 800 sec/100 mL, and further preferably from 50 to 500 sec/100 mL. The air permeability that is 1,000 sec/100 mL or less means that the multilayer porous film has continuity and is preferred since excellent air permeation characteristics can be obtained.

The air permeability means the difficulty of the air to pass through the film in the thickness direction thereof, and is specifically shown in terms of period of time that is necessary for 100 mL of the air to pass through the film. Accordingly, a smaller value thereof means easiness to pass through, and a larger value thereof means difficulty to pass through. Therefore, a smaller value thereof means that the film has good continuity in the thickness direction thereof, and a larger value thereof means that the film has poor continuity in the thickness direction thereof. The continuity means the degree of connection of the pores in the thickness direction of the film. The multilayer porous film of the present invention that has a low air permeability may be applied to various purposes. For example, in the case where the multilayer porous film is used as a separator for a nonaqueous electrolytic solution secondary battery, the low air permeability means easiness in migration of lithium ion, and is preferred since excellent battery capability can be obtained.

The air permeability (Gurley permeability) of the multilayer porous film is measured by a method according to JIS P8117 (2009).

The multilayer porous film of the present invention preferably has SD characteristics on using as a battery separator. Specifically, the air permeability after heating to 135° C. for 5 seconds is preferably 10,000 sec/100 mL or more, more preferably 25,000 sec/100 mL or more, and further preferably 50,000 sec/100 mL or more. When the air permeability after heating to 135° C. for 5 seconds is 10,000 sec/100 mL or more, the pores are quickly closed in the occurrence of abnormal heat to shutdown the current, and thus troubles, such as explosion of the battery, can be avoided.

The multilayer porous film of the present invention preferably has a thermal shrinkage factor at 150° C. of less than 10%, more preferably less than 9%, and further preferably less than 8%, in both the longitudinal direction and the transverse direction. The shrinkage factor at 150° C. that is less than 10% suggests that the film has good dimensional stability and has heat resistance even in the occurrence of abnormal heat exceeding the SD temperature, whereby the film is prevented from being broken, and the internal short circuit temperature can be enhanced. The lower limit of the shrinkage factor is 0%.

The shrinkage factor of the multilayer porous film can be measured, for example, by the following method.

The multilayer porous film is cut into a dimension of 150 mm in length and 10 mm in width, and two marks are made with a distance of 100 mm in the longer direction, so as to prepare a specimen. The specimen is placed in an oven set at 150° C. and allowed to stand therein for one hour. The specimen is taken out from the oven, and after cooling, the distance of the two marks is measured. The shrinkage factor is calculated according to the following expression.

shrinkage factor (%)=100·length after heating

The measurement is performed for the longitudinal direction and the transverse direction of the multilayer porous film.

The multilayer porous film of the present invention has a uniform coated layer having enhanced surface smoothness since the coated layer is formed by using a dispersion liquid containing the alumina slurry of the present invention. The surface smoothness can be evaluated, for example, in such a manner that the surface of the multilayer porous film on the side of the coated layer is observed with a microfigure measuring device ("ET4000A", produced by Kosaka Laboratory Ltd.) for a view field of 300 μm×400 μm, and the number of protrusions that protrude from the surrounding by 5 μm or more (roughness value) is counted. When the roughness value is smaller, the film has excellent surface smoothness.

The roughness value is preferably less than 100 per $mm^2$, and more preferably less than 80 per $mm^2$, since troubles on conveying and appearance failure of the film can be reduced. The lower limit thereof is not particularly limited, and is ideally 0 per $mm^2$, and preferably $10^{-10}$ per $mm^2$ or more as a practical value.

Nonaqueous Electrolytic Solution Secondary Battery

Figure 1:
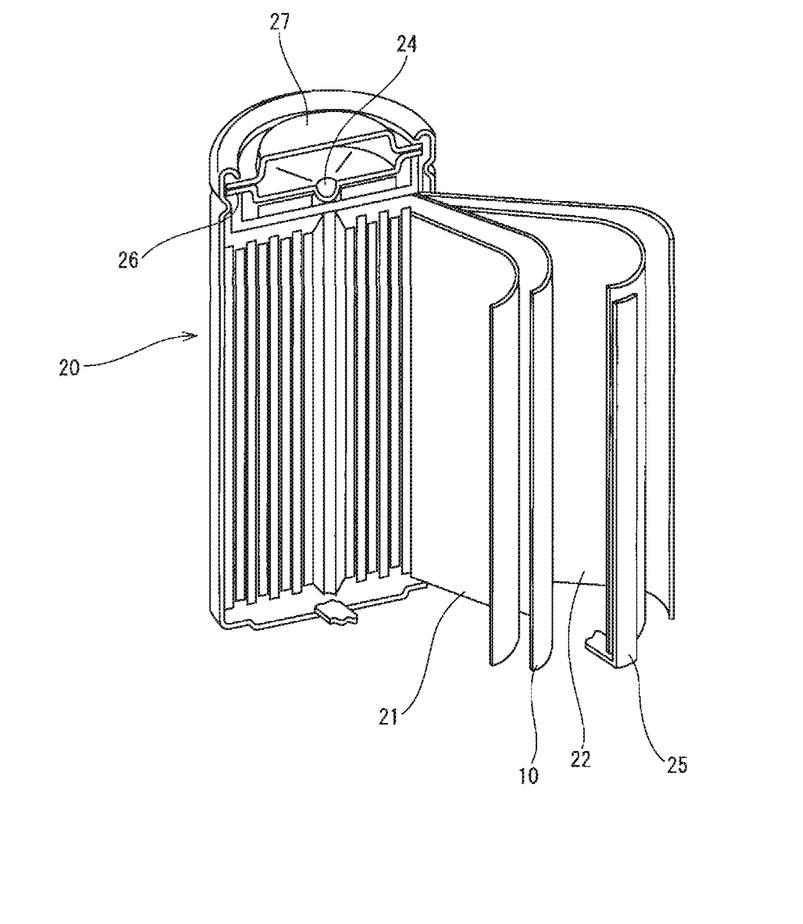
FIG. 1 is a schematic cross sectional view of a battery containing a multilayer porous film of the invention.

A nonaqueous electrolytic solution secondary battery that has the multilayer porous film of the present invention installed as a battery separator will be described with reference to FIG. 1.

A positive electrode plate 21 and a negative electrode plate 22 are superimposed on each other with a battery separator 10 intervening between them and wound into a spiral form, and the outer periphery thereof is fixed with a tape, thereby producing a wound assembly.

The winding process will be described in detail. One end of the battery separator is inserted into a slit of a pin, and the pin is slightly rotated to wind the end of the battery separator on the pin. At this time, the coated layer of the separator is in contact with the surface of the pin. Thereafter, the positive electrode and the negative electrode are disposed to hold the battery separator between them, and the pin is rotated with a winding device to wind the positive and negative electrodes and the battery separator. After winding, the pin is withdrawn from the wound assembly.

The wound assembly containing the positive electrode 21, the battery separator 10, and the negative electrode 22 wound integrally is housed in a battery case having a cylindrical shape having a bottom, and lead members 24 and 25 for the positive and negative electrodes are welded. Subsequently, the electrolyte is charged in the battery canister, and after the battery separator 10 and the like are sufficiently impregnated with the electrolyte, the opening of the battery canister is closed with a positive electrode lid 27 with a gasket 26 disposed on the periphery of the opening. The assembly is then subjected to preliminary charging and aging, thereby completing a cylindrical nonaqueous electrolytic solution secondary battery.

The electrolytic solution used contains a lithium salt as an electrolyte dissolved in an organic solvent.

The organic solvent is not particularly limited, and examples thereof include an ester compound, such as propylene carbonate, ethylene carbonate, butylene carbonate, γ-butyrolactone, γ-valerolactone, dimethyl carbonate, methyl propionate, and butyl acetate, a nitrile compound, such as acetonitrile, an ether compound, such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxolane, and sulfolane, which may be used solely or as a mixture of two or more kinds thereof.

Among these, such an electrolyte is preferred that contains lithium hexafluorophosphate ($LiPF_6$) dissolved in a solvent obtained by mixing 1 part by mass of ethylene carbonate and 2 parts by mass of methyl ethyl carbonate in a concentration of 1.0 mol/L.

The negative electrode used may be one obtained by integrating a compound containing an alkali metal or a compound containing an alkali metal and a collector, such as a stainless steel strip. Examples of the alkali metal include lithium, sodium, and potassium. Examples of the compound containing an alkali metal include an alloy of an alkali metal with aluminum, lead, indium, potassium, cadmium, tin, magnesium or the like, a compound of an alkali metal with a carbon material, and a compound of an alkali metal having a low potential with a metal oxide or sulfide. In the case where a carbon material is used as the negative electrode, the carbon material is necessarily capable of being doped and dedoped with lithium ion, and examples thereof used include graphite, thermally decomposed carbon, coke, glassy carbon, a baked material of an organic polymer compound, mesocarbon microbeads, carbon fibers, and activated carbon.

The positive electrode contains an active substance, such as a metal oxide, e.g., lithium cobalt oxide, lithium nickel oxide, lithium manganese oxide, manganese dioxide, vanadium pentoxide, and chromium oxide, and a metal sulfide, e.g., molybdenum disulfide. A composition containing the positive electrode active substance having a conductive assistant, a binder, such as polytetrafluoroethylene, and the like, appropriately added thereto is coated on a collector, such as a stainless steel strip, as a core, to complete a molded article, which is used as the positive electrode.

Example

The alumina slurry and the multilayer porous film of the present invention will be described in more detail with reference to examples and comparative examples shown below, but the present invention is not limited thereto.

Evaluation Methods (1) Average Primary Particle Diameter of Alumina

The average primary particle diameter of alumina was measured by using a laser diffraction particle size distribution measuring device ("HORIBA LA-920", produced by Horiba, Ltd.) with a sodium hexametaphosphate as a dispersant.

(2) Pore Diameter and Pore Volume of Alumina

The pore diameter and the pore volume of alumina were measured by using "NOVA-1200", produced by Quantachrome Instruments, according to JIS Z8831-2 (2010) in such a manner that alumina was cooled to liquid nitrogen temperature, and then the adsorption amount and the desorption amount of nitrogen to the alumina were measured while the nitrogen partial pressure was increased stepwise from 0.02 atm to 0.98 atm.

(3) Specific Surface Area of Alumina

The specific surface area of the alumina was calculated by the BET five-point method by using the value of the nitrogen adsorption amount to the alumina on the low pressure side in the measurement of the pore diameter and the pore volume in the item (2) above.

(4) Viscosity of Alumina Slurry

An alumina slurry was produced by the method described in Examples and Comparative Examples described later, and the viscosities thereof after 1 hour, 24 hours, and 72 hours from the production were measured with a B-type viscometer ("TVB10H", produced by Toki Sangyo Co., Ltd.) at a temperature of 25° C. and a circumferential speed of 100 rpm, which were designated as $\eta_1$, $\eta_{24}$, and $\eta_{72}$ (mPa·s) respectively.

In the following cases, however, it was determined that normal measurement was not able to perform. The cases are shown as "unmeasurable" in Table 1.

The viscosity fluctuated by 10% or more after 3 minutes or more after the start of measurement.

The slurry was cracked on measuring.

(5) Viscosity Stability of Alumina Slurry (Long-Term Storage Stability)

The viscosity stability of the alumina slurry was evaluated by the following standard.

A: Both the values of $\eta_{72}/\eta_1$ and $\eta_{24}/\eta_1$ were less than 10.

C: Any one of the values of $\eta_{72}/\eta_1$ and $\eta_{24}/\eta_1$ was 10 or more or unmeasurable.

(6) Total Thickness of Multilayer Porous Film

The total thickness of the multilayer porous film was measured in such a manner that the multilayer porous film was measured at arbitrary 5 positions within the plane thereof with a 1/1000 mm dial gauge, and the average value thereof was calculated and designated as the total thickness.

(7) Thickness of Coated Layer

The thickness of the coated layer was calculated as a difference between the total thickness of the multilayer porous film after forming the coated layer and the thickness of the polyolefin resin porous film.

(8) Roughness Value and Surface Smoothness

The roughness value was measured by observing the surface of the multilayer porous film on the side of the coated layer with a microfigure measuring device ("ET4000A", produced by Kosaka Laboratory Ltd.) for a view field of 300 m×400 μm, and counting the number of protrusions that protruded from the surrounding by 5 m or more. The surface smoothness was evaluated with the roughness value by the following standard.

A: The roughness value was less than 100 per mm².

C: The roughness value was 100 per mm² or more.

Production of Polyolefin Resin Porous Film

A polypropylene resin ("Novatec PP FY6HA", produced by Nippon Polypropylene Corporation, density: 0.90 g/cm³, MFR: 2.4 g/10 min) and 3,9-bis(4-(N-cyclohexylcarbamoyl) phenyl)-2,4,8,10-tetraoxaspiro[5.5]undecane as a β-crystal nucleating agent were prepared. The raw materials were mixed in such a manner that the β-crystal nucleating agent was mixed in a proportion of 0.2 part by mass per 100 parts by mass of the polypropylene resin. The mixture was placed in and melt-mixed with a co-rotation twin screw extruder (bore diameter: 40 mm, L/D: 32), produced by Toshiba Machine Co., Ltd., at a set temperature of 300° C., and then solidified by cooling in a water bath into strands, which were cut with a pelletizer to produce raw material pellets.

The raw material pellets were again placed in and melted with the extruder, extruded from a T-die, and solidified by cooling with a casting roll at 124° C. to produce a film product.

The film product was stretched in the longitudinal direction at 100° C. to 4.6 times with a longitudinal stretcher, then stretched in the transverse direction at 150° C. to 2.1 times with a transverse stretcher, and then thermally fixed at 153° C. The film was then subjected to a relaxation treatment, and further subjected to a corona surface treatment with a generator CP1, produced by Vetaphone A/S, at a power of 0.4 kW and a speed of 10 m/min, thereby providing a polyolefin resin porous film (thickness: 20 μm).

Example 1

Alumina ("LS-410", produced by Nippon Light Metal Co., Ltd., average primary particle diameter: 0.48 μm, Dv1(M): 0.0077 mL/g, Dv1(80): 0.0077 mL/g, Dv2(M): 0.0080 mL/g, Dv2(80): 0.0080 mL/g, specific surface area: 6.90 m²/g) was allowed to stand in a constant temperature and humidity chamber set at a temperature of 80° C. and a relative humidity of 80% for 3 days, and after radiationally cooling, taken out therefrom. The properties of the treated alumina thus obtained are shown in Table 1.

52.6 parts by mass of the resulting alumina, 5.3 parts by mass of isopropyl alcohol, and 42.1 parts by mass ion-exchanged water were mixed and treated with a bead mill under conditions of a temperature of 25° C. and an average retention time of 0.6 minute, thereby providing an alumina slurry. The bead mill used had the following details.

equipment: "NVM-1.5", produced by Aimex Co., Ltd.
beads: zirconia beads (diameter: 0.5 mm, filling rate: 85%)
circumferential speed: 10 m/sec
discharge amount: 350 mL/min The resulting slurry was subjected to the aforementioned evaluation. The results are shown in Table 1.

The resulting alumina slurry was allowed to stand for one week, and then 61.8 parts by mass of the alumina slurry, 9.9 parts by mass of a 5% by mass polyvinyl alcohol ("PVA-124", produced by Kuraray Co., Ltd.) aqueous solution, and 28.3 parts by mass of ion-exchanged water were mixed, to which hydrochloric acid was added in an amount of 70 ppm based on the total amount, thereby providing a dispersion liquid for forming a coated layer having a solid concentration of 33% by mass.

The resulting dispersion liquid for forming a coated layer was coated on the polyolefin resin porous film with a gravure roll (lattice type, line number: 25 ULinch, depth: 290 m, battery capacity: 145 mL/m²), and then dried in a drying furnace at 45° C. to form a coated layer, thereby providing a multilayer porous film having a total thickness of 24 μm.

The resulting multilayer porous film was subjected to the aforementioned evaluation. The results are shown in Table 1.

Example 2

An alumina slurry and a multilayer porous film having a total thickness of 24 μm were produced in the same manner as in Example 1 except that the alumina before the treatment was changed to "LS-410", produced by Nippon Light Metal Co., Ltd. (average primary particle diameter: 0.60 m, Dv1 (M): 0.0074 mL/g, Dv1(80): 0.0074 mL/g, Dv2(M): 0.0077 mL/g, Dv2(80): 0.0077 mL/g, specific surface area: 6.23 m²/g), and subjected to the aforementioned evaluation. The results are shown in Table 1.

Example 3

An alumina slurry and a multilayer porous film having a total thickness of 24 μm were produced in the same manner as in Example 1 except that the alumina before the treatment was changed to "LS-410", produced by Nippon Light Metal Co., Ltd. (average primary particle diameter: 0.53 μm, Dv1(M): 0.0062 mL/g, Dv1(80): 0.0062 mL/g, Dv2(M): 0.0061 mL/g, Dv2(80): 0.0061 mL/g, specific surface area: 6.27 m$^2$/g), and subjected to the aforementioned evaluation. The results are shown in Table 1.

Example 4

An alumina slurry and a multilayer porous film having a total thickness of 24 m were produced in the same manner as in Example 1 except that the alumina before the treatment was changed to "LS-410", produced by Nippon Light Metal Co., Ltd. (average primary particle diameter: 0.66 μm, Dv1(M): 0.0049 mL/g, Dv1(80): 0.0049 mL/g, Dv2(M): 0.0073 mL/g, Dv2(80): 0.0073 mL/g, specific surface area: 6.04 m$^2$/g), and subjected to the aforementioned evaluation. The results are shown in Table 1.

Comparative Example 1

An alumina slurry and a multilayer porous film having a total thickness of 25 μm were produced in the same manner as in Example 1 except that alumina of the same lot as the alumina used in Example 1 was used without the treatment in the constant temperature and humidity chamber, and subjected to the aforementioned evaluation. The results are shown in Table 1.

Comparative Example 2

An alumina slurry and a multilayer porous film having a total thickness of 26 μm were produced in the same manner as in Example 2 except that alumina of the same lot as the alumina used in Example 2 was used without the treatment in the constant temperature and humidity chamber, and subjected to the aforementioned evaluation. The results are shown in Table 1.

Comparative Example 3

An alumina slurry and a multilayer porous film having a total thickness of 25 μm were produced in the same manner as in Example 3 except that alumina of the same lot as the alumina used in Example 3 was used without the treatment in the constant temperature and humidity chamber, and subjected to the aforementioned evaluation. The results are shown in Table 1.

Comparative Example 4

An alumina slurry and a multilayer porous film having a total thickness of 25 μm were produced in the same manner as in Example 4 except that alumina of the same lot as the alumina used in Example 4 was used without the treatment in the constant temperature and humidity chamber, and subjected to the aforementioned evaluation. The results are shown in Table 1.

TABLE 1

| | | Unit | Example 1 | Example 2 | Example 3 | Example 4 | Comparative Example 1 |
|---|---|---|---|---|---|---|---|
| Alumina | Average primary diameter | μm | 0.48 | 0.60 | 0.53 | 0.66 | 0.48 |
| | Dv1(80) | mL/g | 0.0076 | 0.0076 | 0.0077 | 0.0049 | 0.0077 |
| | Dv1(M) | mL/g | 0.0145 | 0.0098 | 0.0245 | 0.0060 | 0.0077 |
| | Dv2(80) | mL/g | 0.0087 | 0.0065 | 0.0088 | 0.0046 | 0.0080 |
| | Dv2(M) | mL/g | 0.0100 | 0.0080 | 0.0115 | 0.0071 | 0.0080 |
| | Specific surface area | m$^2$/g | 10.10 | 8.50 | 10.71 | 6.24 | 6.90 |
| | Content in slurry | % by mass | 52.60 | 52.60 | 52.60 | 52.60 | 52.60 |
| Dispersion medium | Water | % by mass (in dispersion medium) | 88.9 | 88.9 | 88.9 | 88.9 | 88.9 |
| | Lower alcohol (IPA) | % by mass (in dispersion medium) | 11.1 | 11.1 | 11.1 | 11.1 | 11.1 |
| Evaluation results | $\eta_1$ | mPa·s | 28 | 2,800 | 3,300 | 3,460 | 28 |
| | $\eta_{24}$ | mPa·s | 30 | 3,100 | 3,300 | 3,430 | 450 |
| | $\eta_{72}$ | mPa·s | 34 | 3,200 | 3,500 | 3,350 | unmeasurable |
| | $\eta_{24}/\eta_1$ | — | 1.07 | 1.11 | 1.00 | 0.99 | 16.07 |
| | $\eta_{72}/\eta_1$ | — | 1.21 | 1.14 | 1.06 | 0.97 | — |
| | Viscosity stability (Long-term storage stability) | — | A | A | A | A | C |
| | Roughness value | per mm$^2$ | <100 | <100 | <100 | <100 | 333 |
| | Surface smoothness | — | A | A | A | A | C |

| | | | Unit | Comparative Example 2 | Comparative Example 3 | Comparative Example 4 |
|---|---|---|---|---|---|---|
| | Alumina | Average primary diameter | μm | 0.60 | 0.53 | 0.66 |
| | | Dv1(80) | mL/g | 0.0074 | 0.0062 | 0.0049 |
| | | Dv1(M) | mL/g | 0.0074 | 0.0062 | 0.0049 |
| | | Dv2(80) | mL/g | 0.0077 | 0.0061 | 0.0073 |
| | | Dv2(M) | mL/g | 0.0077 | 0.0061 | 0.0073 |
| | | Specific surface area | m$^2$/g | 6.23 | 6.27 | 6.04 |
| | | Content in slurry | % by mass | 52.60 | 52.60 | 52.60 |

TABLE 1-continued

| | | | | | |
|---|---|---|---|---|---|
| Dispersion medium | Water | % by mass (in dispersion medium) | 88.9 | 88.9 | 88.9 |
| | Lower alcohol (IPA) | % by mass (in dispersion medium) | 11.1 | 11.1 | 11.1 |
| Evaluation results | $\eta_1$ | mPa·s | 2,800 | 3,300 | 3,430 |
| | $\eta_{24}$ | mPa·s | unmeasurable | unmeasurable | unmeasurable |
| | $\eta_{72}$ | mPa·s | 4,500 | unmeasurable | unmeasurable |
| | $\eta_{24}/\eta_1$ | — | — | — | — |
| | $\eta_{72}/\eta_1$ | — | 1.61 | — | — |
| | Viscosity stability (Long-term storage stability) | — | C | C | C |
| | Roughness value | per mm$^2$ | 250 | 333 | 333 |
| | Surface smoothness | — | C | C | C |

It is found from Table 1 that the alumina slurries of Examples 1 to 4 are excellent in viscosity stability in long-term storage, and the multilayer porous film having a coated layer formed therewith are excellent in surface smoothness.

The alumina slurries of Comparative Examples 1 to 4 were inferior in viscosity stability in long-term storage, and the multilayer porous films having a coated layer formed therewith had low surface smoothness and were inferior in productivity.

INDUSTRIAL APPLICABILITY

The alumina slurry of the present invention undergoes considerably small fluctuation in viscosity even in long-term storage, and thus the use of a dispersion liquid containing the slurry and a resin binder can form a uniform coated layer by a coating method in the production of a multilayer porous film containing a polyolefin resin porous film having on at least one surface thereof the coated layer, thereby stabilizing the productivity of the film.

The multilayer porous film can be favorably used as a separator for a nonaqueous electrolytic solution secondary battery and the like. In addition to this, the multilayer porous film can be applied to various purposes that require air permeability characteristics. Specifically, the multilayer porous film can be favorably applied to a sanitary material, such as a liquid absorbent pad for a disposable diaper, a sanitary product and the like, and a bed sheet; a medical material, such as a surgical operating gown and a base material for fomentation; a clothing material, such as a jacket, a sportswear, and a rain apparel; a building material, such as wallpaper, a roof waterproofing material, a heat insulating material, and an acoustic absorbing material; a drying agent; a desiccant; a deoxidant; a disposable warmer; and a material, such as a packaging material for freshness-keeping packaging, food packaging and the like.

REFERENCE SIGN LIST 10 separator for nonaqueous electrolytic solution secondary battery
20 secondary battery
21 positive electrode plate
22 negative electrode plate
24 positive electrode lead member
25 negative electrode lead member
26 gasket
27 positive electrode lid

The invention claimed is:

1. An alumina slurry, comprising alumina dispersed in a dispersion medium,
wherein:
the alumina has an average primary particle diameter of 0.1 μm or more and 1.0 μm or less;
the alumina has a specific surface area of 5.0 m$^2$/g or more and 15.0 m$^2$/g or less;
the alumina slurry has a content of the alumina of 30% by mass or more and 70% by mass or less;
a content of water in the dispersion medium is 50% by mass or more; and
the alumina satisfies the following condition (1):
condition (1): in relationship of a pore diameter r1 (Å) and a pore volume Dv1 (mL/g) of the alumina measured by a nitrogen desorption method based on JIS Z8831-2 (2010), the pore volume Dv1(80) at r1=80 and a value Dv1(M) satisfies Dv1(M)>Dv1(80),
wherein Dv1(M) is the maximum value of Dv1 in a range 20≤r1≤80,
wherein the value of Dv1(80)/Dv1(M) is 0.20 or more.

2. The alumina slurry according to claim 1, wherein the alumina further satisfies the following condition (2):
condition (2): in relationship of a pore diameter r2 (Å) and a pore volume Dv2 (mL/g) of the alumina measured by a nitrogen adsorption method based on JIS Z8831-2 (2010), the pore volume Dv2(80) at r2=80 and a value Dv2(M) satisfies Dv2(M)>Dv2(80),
wherein Dv2(M) is the maximum value of Dv2 in a range 20≤r2≤80.

3. The alumina slurry according to claim 1, wherein the dispersion medium comprises a lower alcohol having from 1 to 4 carbon atoms in an amount in a range of 1% by mass or more and 20% by mass or less.

4. A multilayer porous film, comprising a polyolefin resin porous film having on at least one surface thereof a coated layer, the coated layer being formed from a dispersion liquid comprising the alumina slurry of claim 1 and a resin binder.

5. The multilayer porous film according to claim 4, wherein the resin binder is at least one selected from the group consisting of a polyvinyl alcohol, a polyvinylidene fluoride, a carboxymethyl cellulose, a polyacrylic acid, and a polyacrylic acid derivative.

6. A separator for a nonaqueous electrolytic solution secondary battery, the separator comprising the multilayer porous film of claim 4.

7. A nonaqueous electrolytic solution secondary battery, comprising the separator of claim 6.

8. The alumina slurry according to claim 1, wherein Dv1(80) is in a range of from 0.001 to 0.01 mL/g.

9. The alumina slurry according to claim 1, wherein Dv1(M) is in a range of from 0.003 to 0.05 mL/g.

10. The alumina slurry according to claim 1, wherein Dv1(80)/Dv1(M) is 0.20 or more and 0.90 or less.

11. The alumina slurry according to claim 2, wherein Dv2(80) is in a range of from 0.001 to 0.01 mL/g.

12. The alumina slurry according to claim 2, wherein Dv2(M) is in a range of from 0.005 to 0.03 mL/g.

13. The alumina slurry according to claim 2, wherein the value of Dv2(80)/Dv2(M) is 0.95 or less.

14. The alumina slurry according to claim 2, wherein the value of Dv2(80)/Dv2(M) is 0.20 or more.

15. An alumina slurry, comprising alumina dispersed in a dispersion medium,
wherein:
the alumina has an average primary particle diameter of 0.1 μm or more and 1.0 μm or less;
the alumina has a specific surface area of 5.0 m$^2$/g or more and 15.0 m$^2$/g or less;
the alumina slurry has a content of the alumina of 30% by mass or more and 70% by mass or less;
a content of water in the dispersion medium is 50% by mass or more; and
the alumina satisfies the following condition (1):
condition (1): in relationship of a pore diameter r1 (Å) and a pore volume Dv1 (mL/g) of the alumina measured by a nitrogen desorption method based on JIS Z8831-2 (2010), the pore volume Dv1(80) at r1=80 and a value Dv1(M) satisfies Dv1(M)>Dv1(80),
wherein Dv1(M) is the maximum value of Dv1 in a range $20 \leq r1 \leq 80$,
and the alumina further satisfies the following condition (2):
condition (2): in relationship of a pore diameter r2 (Å) and a pore volume Dv2 (mL/g) of the alumina measured by a nitrogen adsorption method based on JIS Z8831-2 (2010), the pore volume Dv2(80) at r2=80 and a value Dv2(M) satisfies Dv2(M)>Dv2(80),
wherein Dv2(M) is the maximum value of Dv2 in a range $20 \leq r2 \leq 80$,
wherein the value of Dv2(80)/Dv2(M) is 0.20 or more.

* * * * *